July 20, 1965 A. E. SANDS 3,195,984
COLUMN DISSOLVER
Filed May 5, 1960
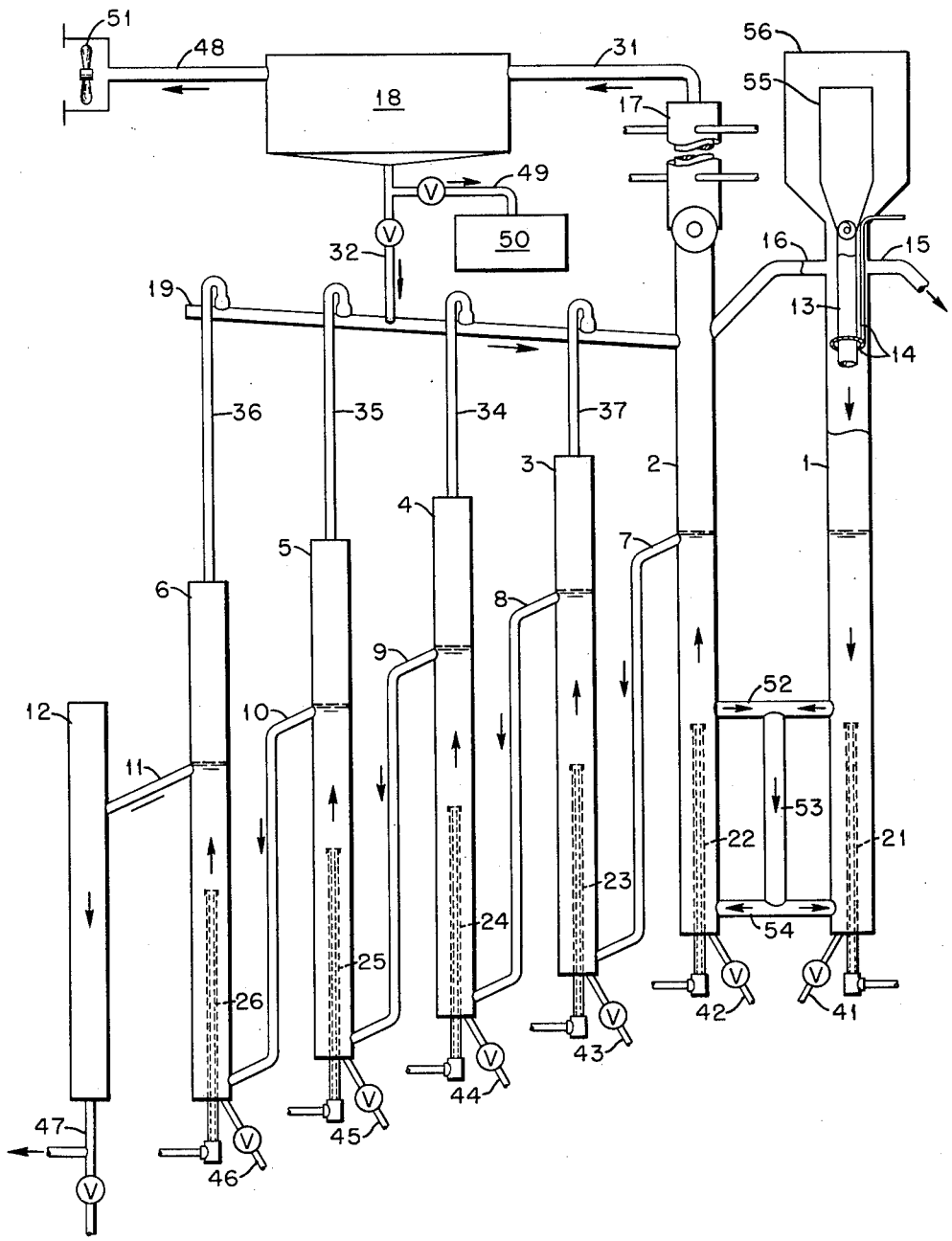
INVENTOR.
Arthur E. Sands
BY
ATTORNEY

United States Patent Office 3,195,984
Patented July 20, 1965

3,195,984
COLUMN DISSOLVER
Arthur E. Sands, Oak Ridge, Tenn., assignor to the United States of America as represented by the United States Atomic Energy Commission
Filed May 5, 1960, Ser. No. 27,226
3 Claims. (Cl. 23—267)

My invention relates to systems for dissolving solids, and more specifically to systems for carrying out continuous dissolution processes.

The residues from many uranium processing operations contain a sufficiently high concentration of uranium to warrant recovery of uranium values from them. Generally, one of the preliminary steps in a uranium recovery process comprises dissolving these residues. However, processing of these residues presents difficulties which have not been overcome by prior art dissolution systems. These difficulties arise from the facts that, first, these residues are usually difficult to dissolve and consequently must be brought into contact with corrosive fluids, and second, some residues contain a higher concentration of $U^{235}$ than that in natural uranium, thus presenting a nuclear hazard unless proper measures are taken.

Continuous processes for recovering metal values from substances containing said values are well-known in the art and a variety of systems have been developed for carrying them out. However, when corrosive fluids are employed in dissolving particulate solids serious difficulties have been encountered in the operation of prior art continuous systems. These difficulties arise largely from the necessity for agitating and moving the suspension of solids in order to achieve intimate contact between the solids and the dissolving liquid. Mechanical agitation and agitation by forcibly introducing a fluid into the suspension have been employed in the prior art. However, systems which have incorporated therein mechanical agitating means are subject to failure in corrosive environments, and it is not always feasible to introduce a fluid in a quantity sufficient to achieve adequate agitation. Dilution of the dissolving liquid when a liquid is introduced or entrainment of corrosive liquids when gas is introduced are undesirable in many processes.

The need for ensuring nuclear safety when processing uranium enriched in $U^{235}$ is clear. Criticality control by controlling the geometry of a uranium-containing substance, i.e., limiting the dimensions of vessels, is probably the best way of eliminating criticality hazards. However, reducing the size of vessels normally used in dissolution processes to dimensions which provide a safe configuration reduces the amount of material that can be processed therein to a level which greatly increases processing costs, and is not a satisfactory solution.

It is one object of my invention to provide an improved dissolution system.

It is another object of my invention to provide a dissolution system which has an improved means for agitating and circulating solid particles suspended within a dissolving medium.

It is an additional object to provide a dissolution system which has no mechanical moving parts.

It is an additional object to provide an improved dissolution system for processing uranium enriched in the $U^{235}$ isotope.

It is another object of my invention to provide an improved system for continuously dissolving material wherein corrosive fluids constitute the dissolution agents.

Other objects of my invention will become apparent from the following detailed description and the claims appended thereto.

In accordance with my invention I have provided an improved system for dissolving particulate solids comprising a plurality of serially-connected vertically-disposed tubular columns including an initial column and a final column, each of said columns having an upper portion and a lower portion; elongated heating means vertically disposed in the lower portion of each column and adapted to form an annulus with said column; vapor outlet means in the upper portion of each of said columns; vapor condensing means communicating with said vapor outlet means; means for returning condensed vapor to said columns; fluid outlet means in the upper portion of each of said columns; fluid inlet means in the lower portion of each of said columns; fluid conduit means providing a passageway from the fluid outlet means of each column to the fluid inlet means of the next succeeding column; means for introducing particulate solids and liquids in said initial column, and liquid removing means in said final column. In the preferred embodiment of my invention I have provided thermal fluid cycling means for enhancing the convection currents at the feed end where particles are larger and greater agitation is needed. I have also provided means for maintaining subatmospheric pressure in the upper portion of the columns. By this means corrosive vapors are swept away from solids introducing means.

In my system particulate solids having a wide range of density and size can be dissolved efficiently. As used herein, the term "dissolve" is intended to be interpreted in its broadest sense as including an operation wherein a minor portion of the solids is soluble and is dissolved (leaching) as well as an operation where a major portion of the solids is dissolved. The density of the solids may range from slightly over that of the dissolving medium to three or four times that of the dissolving medium and the particle size may range from less than 200 mesh to over 20 mesh. My system provides superior agitation and yet there are no mechanical moving parts in contact with fluids. The heating means together with the column wall defines an annulus through which solids-containing liquid flows. This arrangement retains all solids which tend to settle within the convection currents established by the heating means. In addition to providing agitation, the heating means, in cooperation with vapor condensing means, provides a means for controlling the concentration of dissolved material in the product by refluxing or removing condensate from the system in accordance with the needs of the system. An important advantage of my system is the fact that it can be constructed from standard parts such as pipes and pipe fittings. This is an advantage not only in construction of the system, but in its maintenance since parts which fail can be replaced with materials generally on hand with a minimum of fabrication.

By limiting the diameter of the columns the system can be made nuclear-safe for uranium enriched in $U^{235}$ to a high level. For instance, materials containing uranium enriched to 90% $U^{235}$ can be processed safely in systems where the column diameter is six inches or less.

Referring now to the drawing which is a diagrammatic representation of one form of my invention, heating elements 21–26 are disposed in the bottom portion of columns 1–6, respectively, and each forms an annulus with its associated column wall. The upper portion of column 1 is provided with solids introducing means 13, which may be a screw feeder or the like, and liquid introducing means 14. The solids introducing means communicates with feed hopper 55, which is restricted in size to meet nuclear safety requirements, or with feed hopper 56 which may be larger. Suitable means for introducing a liquid comprises a hollow ring provided with perforations on the outer surface. The perforations should be sized so that for the rate of introduction of the dissolving liquid employed, the liquid has sufficient velocity to impinge on the internal wall of the column, thereby washing down any solids which have a tendency to build up on the column wall. The liquid introducing means is preferably located above the solids introducing means and both are located well above the outlet in column 2 to which conduit 7 is connected and high enough so that corrosive fluids do not contact them. The minimum vertical distance from the feed introducing means to the inlet to conduit 7 may range from approximately 1 foot under conditions of mild agitation and a minimum of foaming to over 5 feet if extensive foaming is anticipated.

Conduit 7 interconnects the upper portion of column 2 with the lower portion of column 3 and in the same manner columns 3, 4, 5 and 6 are interconnected by conduits 8, 9 and 10. The outlets for the columns may be at the same level. In the operation of a system constructed in this manner, liquid builds up above the level of the outlet in an amount sufficient to provide head for the necessary flow of fluid through the system. However, build-up of liquid above the outlets is undesirable because this zone is outside the normal flow of fluid, thus contributing little to dissolution; in addition, foam-producing agents which may be present in material being dissolved build up in this zone, causing a great amount of undesirable foaming. Consequently, in the preferred form of my invention, the outlet for each column in progressing from columns 2 through 6 is at a progressively lower level, thus establishing a fluid head between columns for providing flow of fluid through the system. The vertical distance between outlets in adjoining columns may be as low as one inch or as great as allowable room will permit. The preferred difference in levels is approximately six inches. The upper portion of column 6 communicates with the product vessel 12 by means of conduit 11. Fluid drains 41-46 are provided in the bottoms of columns 1-6, respectively, and product vessel 12 is provided with product removal line 47. The upper portion of columns 3-6 are conencted to vapor header 19 by vapor outlet conduits 37, 34, 35 and 36, respectively. Vapor header 19 communicates with the upper portion of column 2, and column 1 and column 2 are interconnected by vapor removal conduit 16. The upper portion of column 1 is provided with overflow means 15 which is disposed above fluid inlet means 14. The upper portion of column 2 is provided with a cooling jacket 17 and communicates with an entrainment separator 18 by means of conduit 31. The entrainment separator 18 is provided with condensate return line 32 which feeds condensate back to the columns, and with line 49 which conveys condensate to storage vessel 50. Separator 18 communicates with exhaust fan 51 by means of conduit 48. The lower portions of columns 1 and 2 together with conduits 52, 53 and 54 form a thermal mixing section, the function of which is described in more detail below.

While not essential to the successful operation of my system, it is convenient to have the top section of the first column made of a heat and chemical-resistant glass such as a boro-silicate glass. This permits visual observation of solids and liquid feeds and the solution level. If the glass is used it may be desirable to surround it with a protective screen for safety reasons in case of breakage.

The heaters 21-26 project, finger-like, from the bottom of the columns to a point a substantial distance up the column. In columns 1 and 2 the heaters project approximately to the level of the upper horizontal member 52 of the fluid cycling means. The surface area of the heaters is determined by the heat input requirements and suitable methods of determining the dimensions of the heaters are known to those skilled in the art. An annulus of a size small enough to achieve excellent agitation and yet not unduly restrict fluid flow is achieved when the diameter of the heater is from approximately ¼ to ½ the diameter of the column. For example, a 2-inch diameter heater centered in a 6-inch column makes a particularly suitable annulus. Steam is a suitable source of heat for the heating means. If steam is utilized the heating means can easily be constructed from two concentrically-disposed pipes, the outer of which is closed at the top. Steam can then be caused to flow in through the inner pipe and out through the annulus formed by the two pipes. Electric immersion heaters may easily be adapted for use in my system.

In the preferred form of my invention means are provided for introducing a gas in the lower portion of the columns. Such means, not shown in FIG. 1, may comprise a hollow perforated ring disposed in the annulus formed by the heating means and the column wall and communicating with a source of gas. A reactant gas may be introduced by this means, or gas may be introduced to provide additional or supplemental agitation. Supplemental agitation may be desirable to keep solids in suspension during periods when heating means are ineffective as when a column is being drained. A gas introduced in this manner may also provide cooling for the liquid in the columns.

The column dimensions are not critical and may suitably be varied widely. Suitable column heights range from several feet to over 20 feet and suitable column diameters range from under 2 inches to over 2 feet. The number of columns may be also varied widely, and is dependent upon process conditions. The average residence time required for dissolution, the amount of solids to be dissolved per unit time, and the size of columns determine the minimum number of columns. Other things being equal, a larger number of shorter columns is preferred because of the larger number of dissolving stages achieved.

The elements in the system may be constructed of any materials which are corrosion-resistant to the fluids employed and have suitable mechanical properties. Suitable materials will be obvious to those skilled in the art.

In operation solids are fed continuously into column 1 through inlet means 13. A dissolving agent is fed continuously through the fluid inlet means 14. The heating means 21-26 in columns 1-6 establish convection currents in the liquid, thus providing agitation of the liquid and solids in the columns. In the preferred method of dissolving solids in my system, sufficient heat is introduced in the system to cause boiling. The agitation, caused by rising bubbles, is higher than is possible without boiling, and with most solids the rate of dissolution is increased with an increase in temperature. Concentration of product may also be achieved by boiling the liquid and sending at least a portion of the condensate from the entrainment separator 18 to storage 50 instead of returning it to the columns. In the thermal cycling section comprising the lower portions of columns 1 and 2 and conduits 52, 53, 54, the liquid in conduit 53 cools, thus becoming more dense, flows downwardly as a result of its increased density and is replaced in conduit 53 by fluid flowing from columns 1 and 2 through conduit 52. A circulating flow of the fluid is accordingly established in the lower portion of columns 1 and 2 accentuating the agitation in these columns.

As liquid is fed into the column 1 it rises in columns 1 and 2 and overflows into column 3, where heating continues, and then into succeeding columns until it reaches product vessel 12. The feed and product take-off rates may be suitably controlled so that all soluble material will be dissolved by the time it reaches vessel 12. The product from vessel 12 may be sent to suitable liquid-solids separation equipment such as filters or centrifuges if the product contains insoluble solids. Exhaust means 19 maintains a subatmospheric pressure on the system. Air moves into the system through the feed introducing means in the upper part of column 1, and sweeps vapors away from the inlet, thus preventing the movement of corrosive vapors into contact with feed introducing means and associated metering devices (not shown).

It is clear that various changes can be made in the described system without departing from the spirit of my invention, and it is intended that my invention be limited only as indicated by the appended claims.

Having thus described my invention, what is claimed is:

1. A system for dissolving particulate solids comprising a plurality of serially-connected vertically-disposed tubular columns including a first column, a second column and a final column, each of said columns having an upper portion, an intermediate portion, and a lower portion; elongated heating means vertically disposed in the lower portion of each column and adapted to form an annulus with said column; vapor outlet means in the upper portion of each of said columns; vapor condensing means communicating with said vapor outlet means; means for returning condensed vapor to said columns; means for controlling the amount of condensate returned to said columns; means for maintaining the upper portion of said columns under subatmospheric pressure; fluid inlet means in the lower portion of each of said columns; fluid outlet means in the upper portion of each of said columns subsequent to said first column, said fluid outlet means being stepped down in cascade fashion in proceeding from the second column to the final column; fluid conduit means providing a passageway from each of said fluid outlet means in the columns subsequent to the first column to the fluid inlet means of the next succeeding column; fluid outlet means in the intermediate portion of said first and second columns; first fluid conduit means interconnecting said fluid outlet means in the intermediate portion of said first and second columns, said first fluid conduit means being provided with fluid outlet means in the mid-portion thereof; second fluid conduit means interconnecting the fluid inlet means in the lower portion of said first and second columns, said second fluid conduit means being provided with fluid inlet means in the mid-portion thereof; third fluid conduit means interconnecting the fluid outlet and fluid inlet means in said first and second conduit means; means for introducing liquids and particular solids in the first column; and liquid removing means in the final column.

2. The system of claim 1, wherein the diameter of the heating means in each column is from one-fourth to one-half the diameter of the column.

3. The system of claim 1, wherein the diameter of the tubular columns is not greater than approximately six inches and the diameter of the elongated heating means is from one-fourth to one-half the diameter of said columns.

References Cited by the Examiner

UNITED STATES PATENTS

| | | | |
|---|---|---|---|
| 1,191,108 | 7/16 | Kestner | 159—14 |
| 1,265,863 | 5/18 | Abbott. | |
| 1,766,863 | 6/30 | Wecker | 202—173 |
| 2,160,177 | 5/39 | Shuman | 23—260 |
| 2,773,749 | 12/56 | Pirtle | 23—271 |

OTHER REFERENCES

American Instrument Co., Copyright 1945, 8010–8020 Ga. Ave., Silver Spring, Md., Catalog No. 45, Lib. No. DA-512 (1945) U.S.P.O. page 74.

NORMAN YUDKOFF, *Primary Examiner.*

MAURICE A. BRINDISI, JAMES H. TAYMAN,
*Examiners.*